(12) United States Patent
Fang et al.

(10) Patent No.: US 10,510,257 B2
(45) Date of Patent: Dec. 17, 2019

(54) OBJECT TRACKING METHOD AND OBJECT TRACKING DEVICE

(71) Applicant: Nissan Motor Co., Ltd., Yokohama-shi, Kanagawa (JP)

(72) Inventors: Fang Fang, Kanagawa (JP); Kuniaki Noda, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/311,576

(22) PCT Filed: Jun. 27, 2016

(86) PCT No.: PCT/JP2016/068978
§ 371 (c)(1),
(2) Date: Dec. 19, 2018

(87) PCT Pub. No.: WO2018/002985
PCT Pub. Date: Jan. 4, 2018

(65) Prior Publication Data
US 2019/0236958 A1 Aug. 1, 2019

(51) Int. Cl.
*G08G 1/16* (2006.01)
*B60R 21/00* (2006.01)
*G06K 9/00* (2006.01)
*G06K 9/62* (2006.01)
*G06F 16/906* (2019.01)

(52) U.S. Cl.
CPC ............ *G08G 1/166* (2013.01); *B60R 21/00* (2013.01); *G06F 16/906* (2019.01); *G06K 9/00369* (2013.01); *G06K 9/00805* (2013.01); *G06K 9/6218* (2013.01); *G08G 1/16* (2013.01)

(58) Field of Classification Search
CPC ........ G08G 1/166; G08G 1/16; G06F 16/906; G06K 9/00369; G06K 9/6218; G06K 9/00805; B60R 21/00
See application file for complete search history.

(56) References Cited

U.S. PATENT DOCUMENTS

| 9,182,761 B2 | 11/2015 | Fujita | |
| 9,494,439 B1* | 11/2016 | Ross | .................. B60W 50/029 |
| 10,235,768 B2 | 3/2019 | Sasaki | |
| 2008/0019567 A1* | 1/2008 | Takagi | ............... G06K 9/00369 382/103 |
| 2009/0303078 A1 | 12/2009 | Mochizuki et al. | |
| 2014/0222278 A1 | 8/2014 | Fujita | |

(Continued)

FOREIGN PATENT DOCUMENTS

| CN | 103781685 A | 5/2014 |
| JP | 2002024986 A | 1/2002 |

(Continued)

*Primary Examiner* — Thomas Ingram
(74) *Attorney, Agent, or Firm* — Young Basile Hanlon & MacFarlane, P.C.

(57) ABSTRACT

An object tracking device tracks objects in a time series using an object detection sensor for detecting objects around a host vehicle. When a plurality of objects are detected, the object tracking device sorts the objects into groups in accordance with a degree of influence of the positions of the objects on the movement of the host vehicle. The object tracking device tracks each of the groups as a single object in a time series.

7 Claims, 18 Drawing Sheets

(56) References Cited

U.S. PATENT DOCUMENTS

2017/0205506 A1 7/2017 Voorheis et al.
2017/0301107 A1 10/2017 Sasaki

FOREIGN PATENT DOCUMENTS

| JP | 2002157697 A | 5/2002 |
| JP | 201181567 A | 4/2011 |
| WO | 2008029802 A1 | 3/2008 |
| WO | 2016014548 A1 | 1/2016 |
| WO | 2016092650 A1 | 6/2016 |

* cited by examiner

OBJECT TRACKING METHOD AND OBJECT TRACKING DEVICE

TECHNICAL FIELD

The present invention relates to an object tracking method and an object tracking device.

BACKGROUND

Pedestrian detection devices are known to detect conditions of the presence or absence of pedestrians who are waiting for crossing roads or currently crossing the roads (refer to Japanese Patent Unexamined Publication No. 2002-024986). A pedestrian detection device disclosed in Japanese Patent Unexamined Publication No. 2002-024986 detects pedestrians present around an intersection using a stereo camera and updates a pedestrian management table in accordance with pedestrian tracking results obtained by tracking coordinates indicating the presence of each pedestrian in a time series.

When a large number of pedestrians are present, the amount of data processed in a time series increases, which may increase the workload of the device upon calculation.

SUMMARY

In view of the above problem, the present invention provides an object tracking method and an object tracking device with a workload upon calculation reduced when tracking a plurality of objects in a time series.

An object tracking method according to an aspect of the present invention sorts, when a plurality of objects are detected, the objects into groups in accordance with a degree of influence of positional relationship between the host vehicle and the objects on a movement of the host vehicle, and tracks each of the groups as a single object in a time series.

The object tracking method according to the aspect of the present invention can reduce the workload upon calculation when tracking a plurality of objects in a time series.

DETAILED DESCRIPTION

First Embodiment

Figure 1:
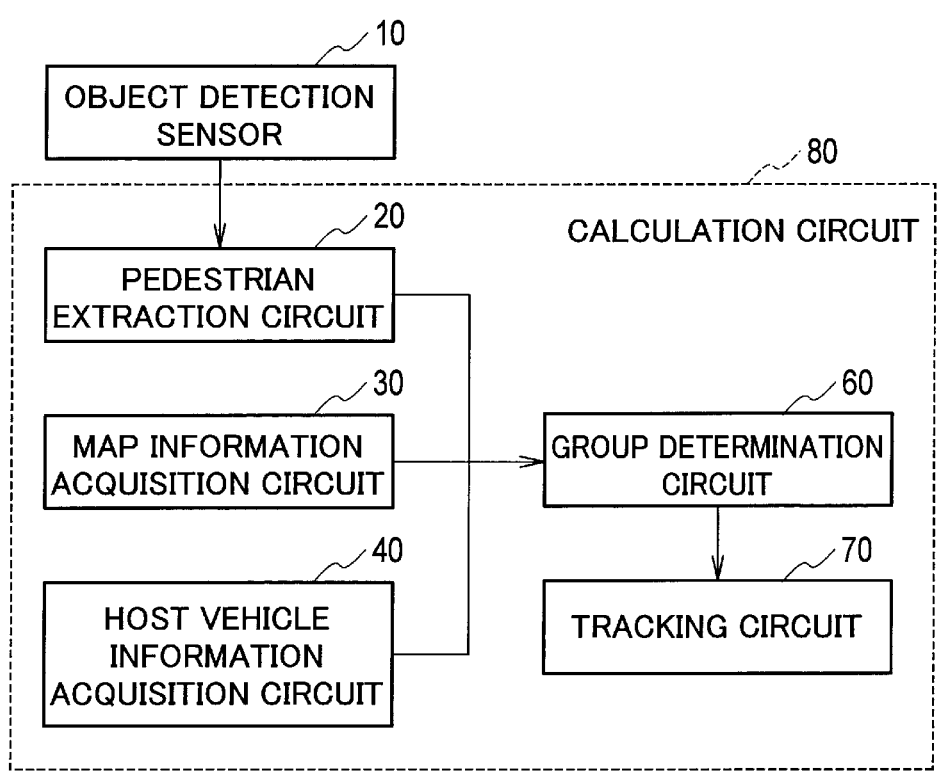
FIG. 1 is a block diagram showing a configuration of an object tracking device according to an embodiment.

An embodiment will be described in detail below with reference to the drawings. The same elements in the descriptions of the drawings are denoted by the same reference numerals, and overlapping explanations are not repeated below.

A configuration of an object tracking device according to the embodiment is described below with reference to FIG. 1. The object tracking device includes an object detection sensor 10 for detecting objects around the host vehicle, and a calculation circuit 80 for tracking the objects in a time series detected by the object detection sensor 10. The calculation circuit 80 includes a pedestrian extraction circuit 20 for extracting pedestrians from the objects detected by the object detection sensor 10, a map information acquisition circuit 30 for acquiring map information around the host vehicle, a host vehicle information acquisition circuit 40 for acquiring information on the host vehicle, a group determination circuit 60, and a tracking circuit 70 for tracking the respective objects in a time series.

The calculation circuit 80 may be a microcomputer including a central processing unit (CPU), a memory, and an input/output unit. A computer program for causing the microcomputer to serve as the calculation circuit 80 is installed to be executed in the microcomputer. Accordingly, the microcomputer functions as the calculation circuit 80. While the present embodiment is illustrated with the case in which the software is installed to fabricate the calculation circuit 80, it should be understood that dedicated hardware for executing each information processing as described below can be prepared to compose the calculation circuit 80. The respective circuits (20, 30, 40, 60, and 70) included in the calculation circuit 80 may be composed of individual hardware. The calculation circuit 80 may also serve as an electronic control unit (ECU) used for other control processing in the host vehicle.

The group determination circuit 60 sorts a plurality of objects simultaneously detected by the object detected sensor 10 into groups depending on a degree of influence of positions of the objects on a movement of the host vehicle. The group determination circuit 60 sorts out objects into groups more specifically as the degree of influence of the positions of the objects on the movement of the host vehicle is greater, and sorts out objects into groups more roughly as the degree of influence of the positions of the objects on the movement of the host vehicle is smaller. In other words, the group determination circuit 60 sorts out objects located in a narrower region into one group as the degree of influence of the positions of the objects on the movement of the host vehicle is greater, and sorts out objects located in a wider region into one group as the degree of influence of the positions of the objects on the movement of the host vehicle is smaller.

The tracking circuit 70 tracks each sorted group as a single object in a time series. When a plurality of objects are detected simultaneously by the object detection sensor 10, the tracking circuit 70 does not track the objects individually but tracks each sorted group as a single object. This decreases the number of objects to be tracked, so as to reduce a processing load of the calculation circuit 80.

The object detection sensor 10 can detect at least a relative position between the host vehicle and each object, and a relative velocity and an attribute of each object. The object detection sensor 10 detects the attribute of an object by determining whether the object is any of: a vehicle, a pedestrian, and a bicycle, or determining that the object is unclear. For example, the object detection sensor 10 captures an image around the host vehicle using a monocular or multi-ocular stereo camera installed in the host vehicle. The object detection sensor 10 executes stereo image processing based on a principle of triangulation from the captured image, so as to obtain three-dimensional coordinates of an object in the image. Alternatively, the object detection sensor 10 may obtain three-dimensional coordinates of the object using a laser rangefinder (LRF) instead of the camera or combined with the camera.

The pedestrian extraction circuit 20 extracts pedestrians from the objects detected by the object detection sensor 10 according to areas, heights from the ground, moving velocities, and shapes of the objects, for example. The pedestrian extraction circuit 20 extracts pedestrians based on the information of attribution to the pedestrians (including the areas, the heights from the ground, the moving velocities, and the shapes), and stores the information of the extracted pedestrians in the memory. The information of attribution can be obtained from the shape and the moving amount of each object, or characteristics such as a face and clothing when using a camera image. Any other method may be used instead.

The present embodiment illustrates the object tracking device which is a pedestrian tracking device for tracking pedestrians extracted from objects detected by the object detection sensor 10.

The map information acquisition circuit 30 acquires map information around the host vehicle according to positional information of the host vehicle preliminarily prepared. All of the map information on roads on which the host vehicle can travel are preliminarily stored as map data in a data storage unit including a semiconductor memory. The map information acquisition circuit 30 searches the map data using the positional information of the host vehicle, and extracts the map information around the host vehicle from the map data. The map information around the host vehicle includes at least information about lanes on roads, widths and shapes of sidewalks, and traffic rules around the host vehicle.

The map information acquisition circuit 30 may search the data storage unit installed in the host vehicle using the positional information of the host vehicle so as to acquire the map information around the host vehicle, or retrieve the map information around the host vehicle from a cloud database to which the host vehicle can be connected via a wireless communication. The map information acquisition circuit 30 thus may acquire the map information around the host vehicle from the data storage unit present either inside or outside of the object tracking device. As used herein, the phrase "around the host vehicle" refers to a predetermined region based on the host vehicle, for example, a region including a detection range of the object detection sensor 10.

The host vehicle information acquisition circuit 40 acquires host vehicle information about at least a velocity, a rate of acceleration, a steering angle, and a traveling route of the host vehicle. The velocity and the rate of acceleration of the host vehicle may be obtained from signals indicating a rotational speed of the wheels output from a wheel speed sensor provided at a wheel of the host vehicle. The steering angle may be obtained from signals indicating a direction, a neutral position, and a turning angle of the steering wheel output from a turning angle sensor attached to a steering shaft. The traveling route is a scheduled route on which the host vehicle travels until reaching a predetermined destination. The traveling route is retrieved from a navigation system and determined by a driver's approval. Any other conventional method may also be used for acquiring the traveling route.

When the object detection sensor 10 simultaneously detects a plurality of objects, and the pedestrian extraction circuit 20 simultaneously extracts a plurality of pedestrians, the group determination circuit 60 sorts pedestrians into groups depending on a degree of influence of positions of the pedestrians on the movement of the host vehicle. In particular, the group determination circuit 60 first executes initial grouping to sort out pedestrians by moving directions. The group determination circuit 60 then executes further specific grouping of the pedestrians moving in the same direction depending on the degree of influence of positions of the pedestrians on the movement of the host vehicle. The group determination circuit 60 calculates the degree of influence on the movement of the host vehicle in accordance with at least one of the position of the host vehicle on the map, the moving direction, moving velocity, and traveling route of the host vehicle, the relative position and relative velocity of each pedestrian to the host vehicle, the moving direction of each pedestrian, the map information around the host vehicle, and the host vehicle information. The group determination circuit 60 may calculate the degree of influence on the movement of the host vehicle using any other information.

For example, as positions of pedestrians are more distant from the position of the host vehicle on the map and the traveling route of the host vehicle, a degree of influence of the presence and movement of the host vehicle on the safety of the pedestrians can be smaller. The group determination circuit 60 therefore determines the degree of influence on the movement of the host vehicle to be smaller as the positions of the pedestrians are more distant from the position of the host vehicle on the map and the traveling route of the host vehicle, and sorts the pedestrians present in a wider region into one group. This decreases the number of sorted groups while ensuring safe movements of both the pedestrians and the host vehicle. Accordingly, the calculating load of tracking the pedestrians can be reduced with sufficient safety of the pedestrians confirmed. The group determination circuit 60 may determine the degree of influence on the movement of the host vehicle to be smaller as the positions of the pedestrians are more distant from either the current position of the host vehicle on the map or the traveling route of the host vehicle.

The group determination circuit 60 calculates and stores a representative position of each group on the map, as well as a size, shape, moving direction, and relative velocity of each group.

The tracking circuit 70 tracks each group as a single pedestrian in a time series. When a plurality of pedestrians are detected simultaneously by the object detection sensor 10, the tracking circuit 70 does not track the pedestrians individually, but can track grouped pedestrians as a single pedestrian in a time series.

Figure 2:
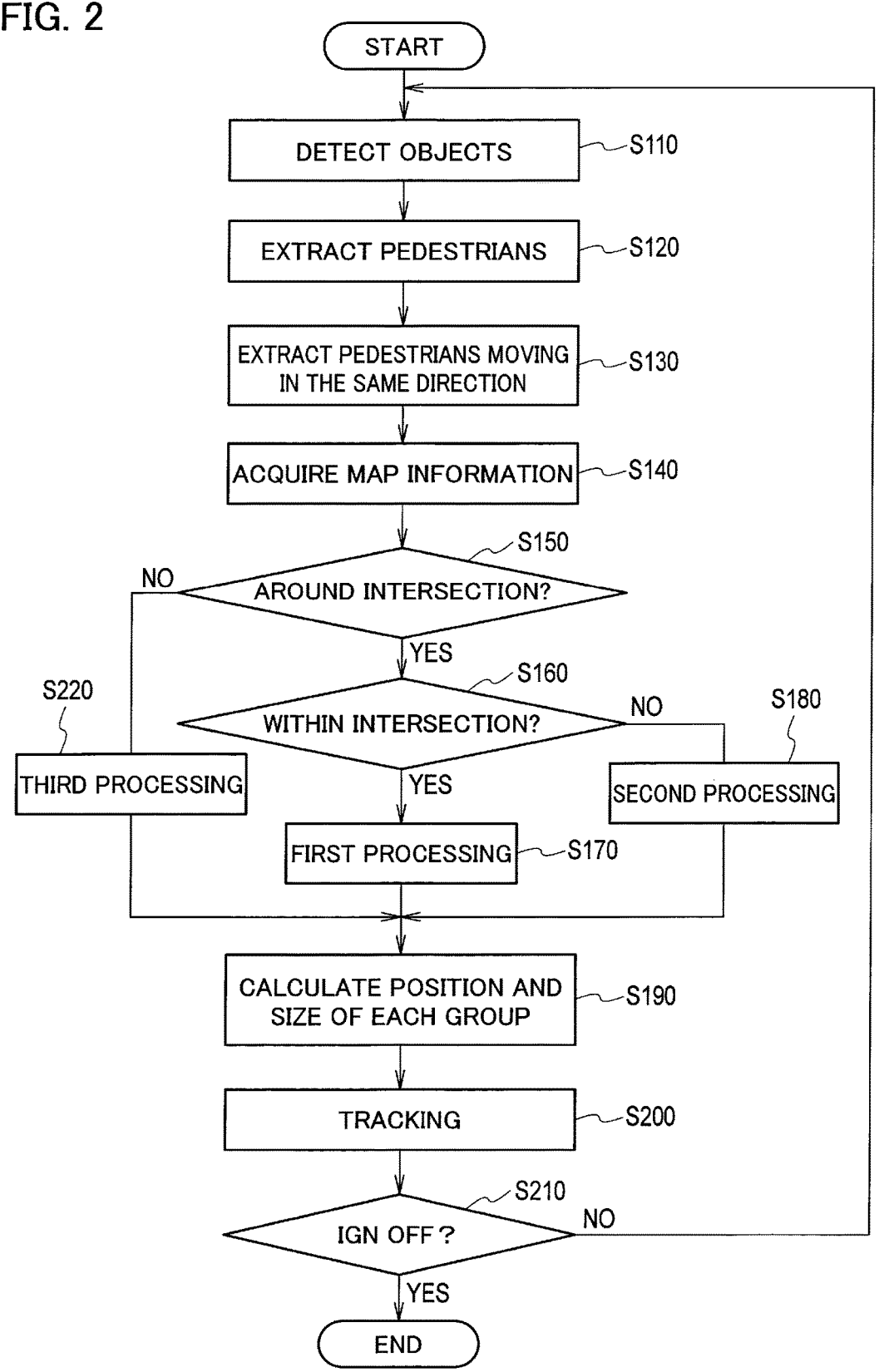
FIG. 2 is a flowchart illustrating an object tracking method using the object tracking device shown in FIG. 1.

An object tracking method using the object tracking device shown in FIG. 1 is illustrated below with reference to FIG. 2.

In step S110, the object detection sensor 10 installed in the host vehicle detects objects around the host vehicle. The process proceeds to step S120, and the pedestrian extract circuit 20 extracts objects of which attributes are pedestrians from the detected objects, and stores the information on the extracted pedestrians in the memory. The information on the pedestrians includes relative positions, relative velocities, and moving directions of the pedestrians with respect to the host vehicle.

The process proceeds to step S130, and the group determination circuit 60 executes initial grouping of the pedestrians simultaneously extracted, in accordance with the speed vectors or moving directions. For example, the group determination circuit 60 sorts a plurality of pedestrians moving in the same direction in the same sidewalk region of any of 2A to 2H or in the same crosswalk of any of 1*a* to 1*d* shown in FIG. 3 into a single initial group.

The process proceeds to step S140, and the map information acquisition circuit 30 acquires the map information around the host vehicle according to the positional information of the host vehicle preliminarily prepared.

In step S150 and S160, the group determination circuit 60 determines whether the positions of the extracted pedestrians are around the intersection or within the intersection. The phrases "around the intersection" and "within the intersection" are described below with reference to FIG. 3.

Figure 3:
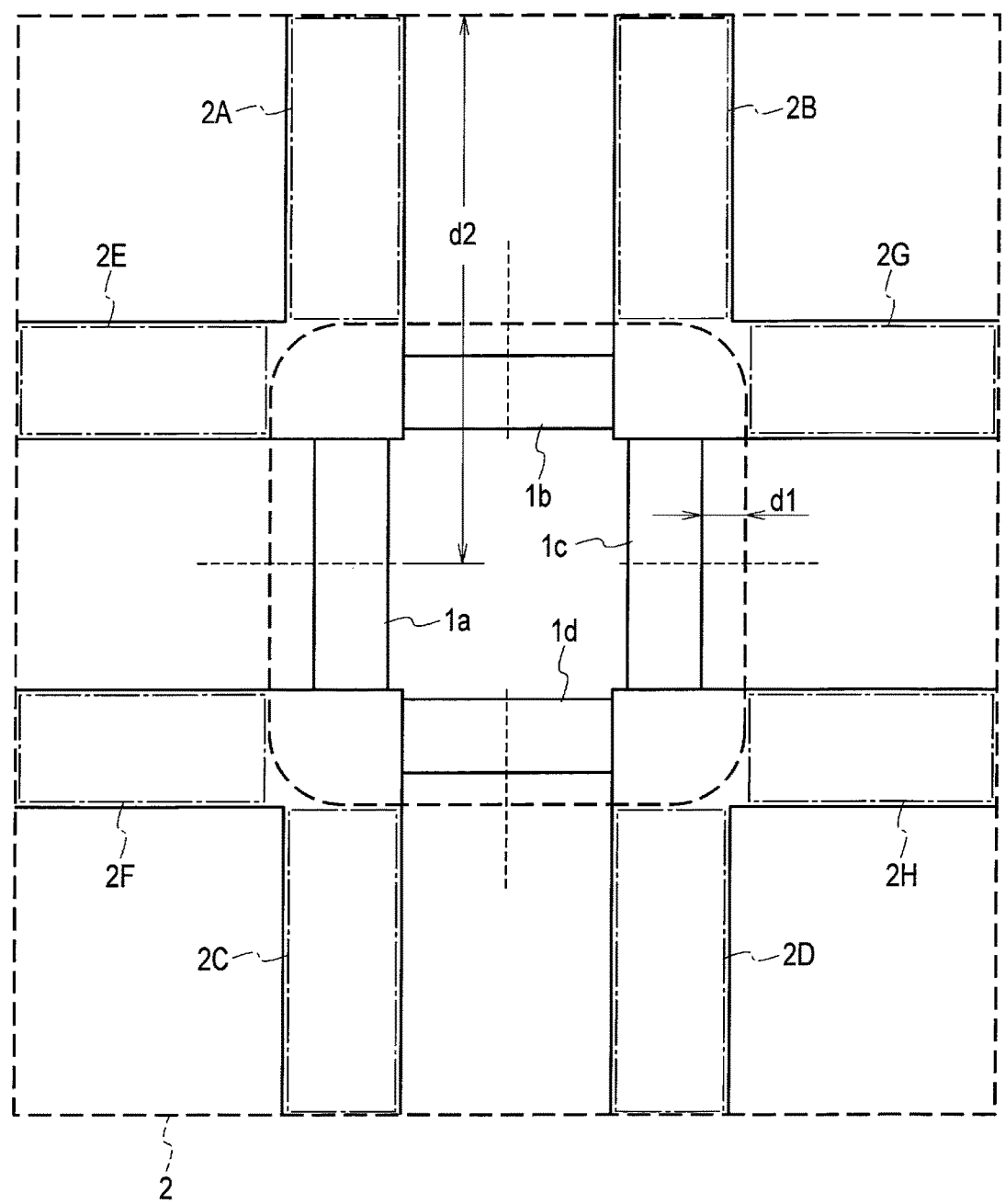
FIG. 3 is a plan view showing an intersection of four roads.

With regard to the intersection of four roads as shown in FIG. 3, the phrase "within the intersection 1" refers to a region in which the roads intersect, the region including four crosswalks 1*a* to 1*d* located in the intersection and further extending outward by a distance d1 from the outer edges of the four crosswalks 1*a* to 1*d*. The "distance d1" is a value determined in view of a detection error of the object detection sensor 10, which is 0.5 meters, for example. The phrase "around the intersection 2" refers to a region including the region "within the intersection 1" and further extending outward by a distance d2 (30 meters, for example) from the center of the intersection. The region "around the intersection 2" includes the eight sidewalk regions 2A to 2H connected to the four crosswalks 1*a* to 1*d*.

In step S150, the group determination circuit 60 determines whether the extracted pedestrians are located around the intersection 2. The process proceeds to step S160 when the extracted pedestrians are located around the intersection 2 (YES in step S150), and the process proceeds to step S220 when the extracted pedestrians are located outside the region around the intersection 2 (NO in step S150) so that the group determination circuit 60 executes the third processing.

In step S160, the group determination circuit 60 determines whether the extracted pedestrians are located within the intersection 1 according to the positional information of the host vehicle acquired in step S140. The process proceeds to step S170 when the extracted pedestrians are located within the intersection 1 (YES in step S160) so that the group determination circuit 60 executes the first processing. The process proceeds to step S180 when the extracted pedestrians are located outside the intersection 2 (NO in step S150) so that the group determination circuit 60 executes the second processing. When a plurality of pedestrians are detected within the intersection 1, around the intersection 2, and outside the region around the intersection 2, the group determination circuit 60 executes the first to third processing for grouping the pedestrians in each region shown in FIG. 3 where the pedestrians are located.

Figure 8:
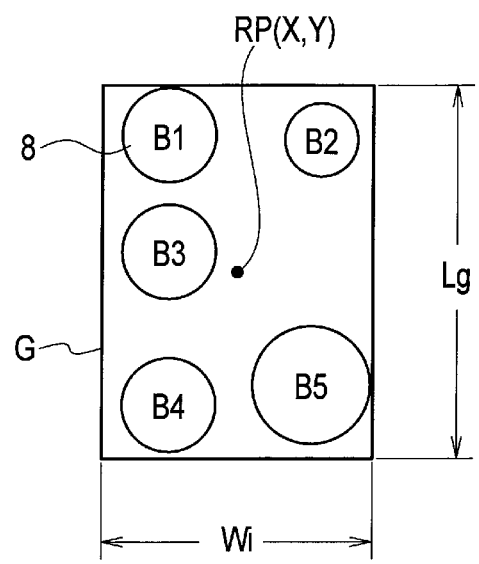
FIG. 8 is a schematic view showing a representative position RP and a size of group G.

The process proceeds to step S190, and the tracking circuit 70 calculates a representative position and a size of each group in order to track each sorted group as a single pedestrian. For example, as shown in FIG. 8, a case in which five pedestrians 8 are sorted out into the same group G is described below. The tracking circuit 70 determines that the group G has a size of a rectangle having a length Lg and a width Wi encompassing all pedestrians 8 included in the group G. The tracking circuit 70 determines a central position RP (X, Y) of the rectangle having the length Lg and the width Wi to be a representative position of the group G.

Figure 9A:
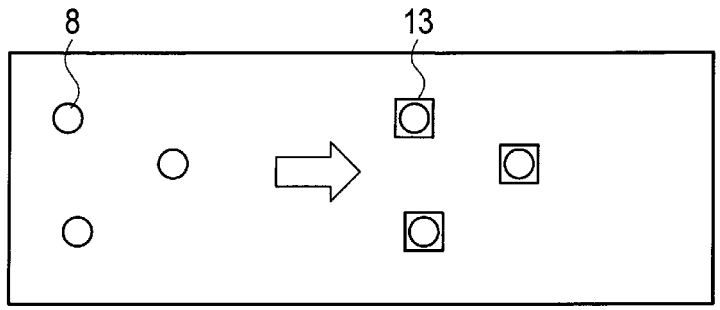
FIG. 9A is a schematic view showing object tracking processing executed only in the first frame.
Figure 9B:
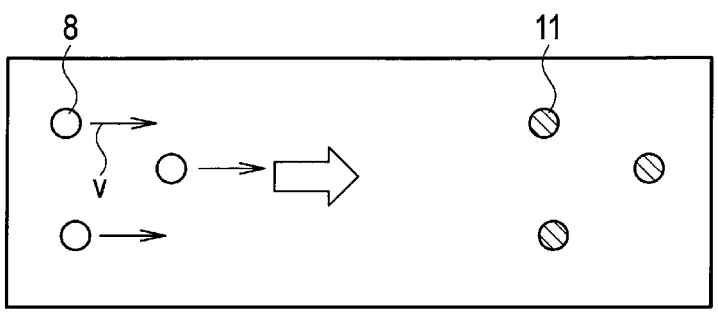
FIG. 9B is a schematic view showing object tracking processing of predicting positions of pedestrians indicated by tracking marks 13.
Figure 9C:
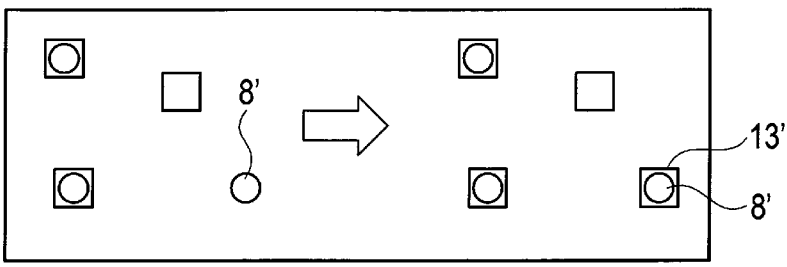
FIG. 9C is a schematic view showing object tracking processing of newly generating a tracking mark 13'.
Figure 9D:
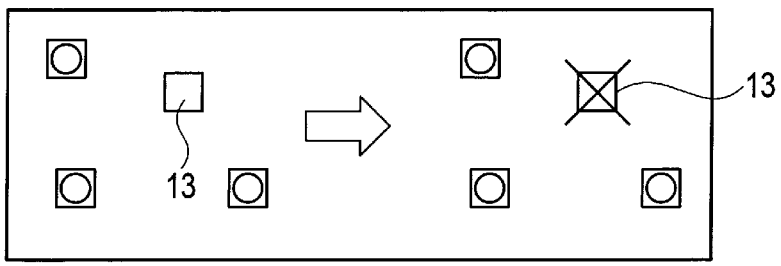
FIG. 9D is a schematic view showing object tracking processing of removing a tracking mark 13.

The process proceeds to step S200, and the tracking circuit 70 tracks each group as a single pedestrian in a time series. For example, the tracking circuit 70 executes tracking processing in a time series with respect to detected objects in four stages as shown in FIG. 9A to FIG. 9D. FIG. 9A is a view showing processing executed only in the first frame. First, the tracking circuit 70 allots tracking marks 13 (trackers) to all of detected pedestrians 8. Second, the tracking circuit 70 predicts the positions of the pedestrians indicated by the tracking marks 13 as shown in FIG. 9B. The tracking circuit 70 predicts the positions of the pedestrians 8 at a subsequent time (T+1) with regard to all of the tracking marks 13 with reference to the moving directions, moving velocities, and positions of the pedestrians, so as to move the tracking marks 13 to the predicted positions 11. Third, the tracking circuit 70 compares the positions (detection positions) of the pedestrians 8 detected at the time (T+1) with the predicted positions 11 shown in FIG. 9B. When a corresponding predicted position 11 cannot be observed within a predetermined distance (for example, six meters) from a detection position 8', as shown in FIG. 9C, the tracking circuit 70 newly generates a tracking mark 13' at a detection position'. Fourth, the tracking circuit 70 removes the tracking mark 13, as shown in FIG. 9D, when a corresponding detection position cannot be observed within a predetermined distance (for example, six meters) from the predicted position 11.

In step S210, the determination of whether an ignition switch (IGN) is turned off is made. When the IGN is turned off (YES in step S210), the process shown in FIG. 2 ends. When the IGN is not turned off (NO in step S210), the process returns to step S110. The process shown in the flowchart of FIG. 2 is repeated in a predetermined cycle until the IGN is turned off.

(First Processing)

The specific steps of the first processing (step S170 in FIG. 2) are described below with reference to FIG. 4. In step S510, a plurality of pedestrians located in the same crosswalk region are sorted into the same group in each of the crosswalks 1a to 1d. The term "crosswalk region" refers to a region including the respective crosswalks 1a to 1d and further extending inward and outward of the intersection by a predetermined distance from each of the circumferential edges of the crosswalks 1a to 1d, as shown in FIG. 5A. Four crosswalk regions 1A to 1D are set to correspond to the four crosswalks 1a to 1d, respectively. For example, five pedestrians 8a and 8b located in the crosswalk region 1A are sorted into the same group, and six pedestrians 8c and 8d located in the crosswalk region 1C are sorted into another group.

The process proceeds to step S520, and a distance between the respective pedestrians belonging to the same group is calculated in accordance with the relative positions of the respective pedestrians to the host vehicle 7. The process proceeds to step S530, and the traveling route 9 acquired by the host vehicle information acquisition circuit 40 is loaded.

The process proceeds to step S540, and the determination of whether the pedestrians grouped in step S510 are present on the traveling route 9 is made. For example, when the host vehicle 7 turns right at the intersection as shown in FIG. 5A, the crosswalk region 1C is present on the traveling route 9 (YES in step S540). The pedestrians located in the crosswalk region 1C are thus determined to be present on the traveling route 9. In this case, the degree of influence of the six pedestrians 8c and 8d on the movement of the host vehicle is high. The six pedestrians 8c and 8d located in the crosswalk region 1C are therefore preferably sorted into further specific groups for tracking. Namely, the pedestrians present in a narrower region are preferably further sorted into groups. The process then proceeds to step S550.

Figure 5A:
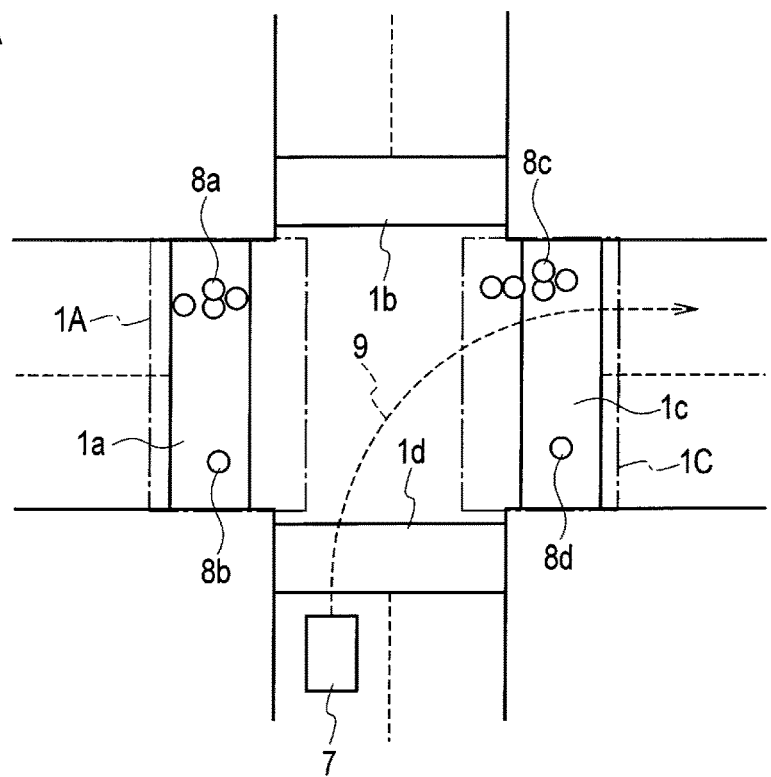
FIG. 5A is a view for describing the first processing, showing pedestrians 8a to 8d present in the intersection.
Figure 5B:
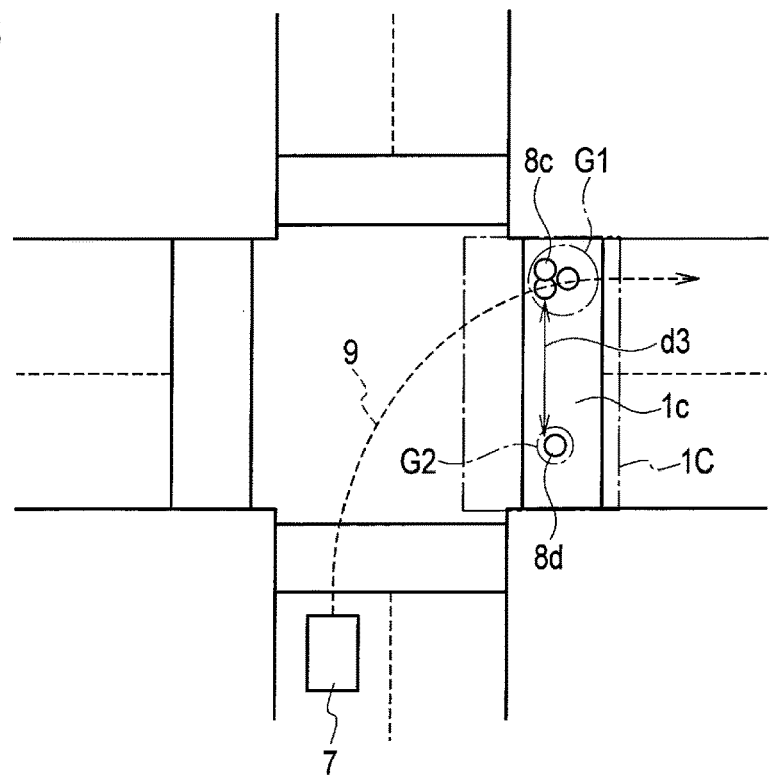
FIG. 5B is a view for describing the first processing, showing the pedestrians 8c and 8d present on a traveling route 9.
Figure 5C:
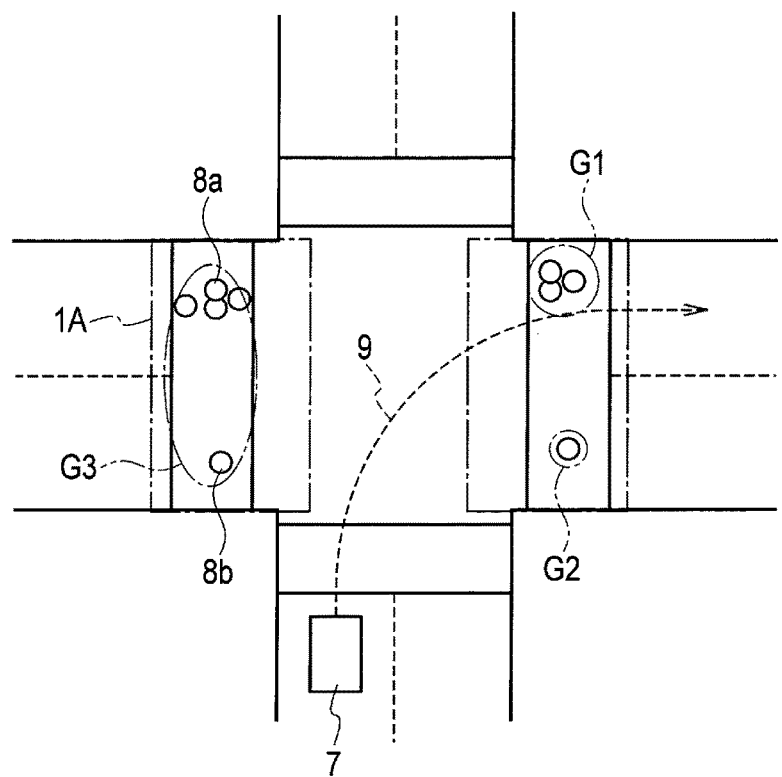
FIG. 5C is a view for describing the first processing, showing the pedestrians 8a and 8b not present on the traveling route 9.

In step S550, the determination of whether each of the six pedestrians 8c and 8d is located on the crosswalk 1c is made. When the pedestrians are located on the crosswalk 1c (YES in step S550), the process proceeds to step S560, and the distance between the respective pedestrians is compared with a predetermined threshold D1. In step S570, the pedestrians with the distance smaller than the threshold D1 are sorted into the same group. For example, as shown in FIG. 5B, the three pedestrians 8c are sorted into the same group G1. The pedestrian 8d is separated from the other three pedestrians 8c by a distance d3. The distance d3 is greater than the threshold D1. The pedestrian 8d is sorted into another group G2.

Figure 5D:
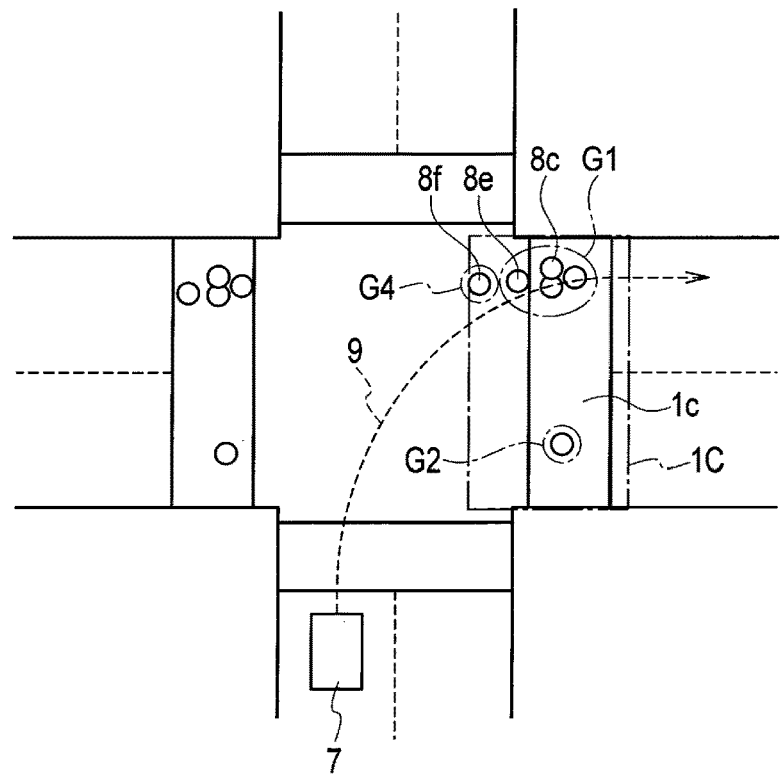
FIG. 5D is a view for describing the first processing, showing pedestrians 8e and 8f not present on a crosswalk 1c.

When the pedestrians 8e and 8f are not present on the crosswalk 1c (NO in step S550) as shown in FIG. 5D, for example, the process proceeds to step S590. In step S590, a distance between the crosswalk 1c and the respective pedestrians 8e and 8f not present on the crosswalk 1c is compared with a predetermined threshold D3. The distance between the pedestrian 8e and the crosswalk 1c is smaller than the threshold D3. In this case, the pedestrian 8e may be sorted into the same group G1 as the three pedestrians 8c present on the crosswalk 1c. The threshold D3 may be set to the same value as an error included in the relative positions of the objects detected by the object detection sensor 10, for example.

The distance between the pedestrian 8f and the crosswalk 1c is the threshold D3 or greater. In this case, the pedestrian 8f deviates the crosswalk 1c by the measurement error or greater and therefore can be determined not to follow traffic rules. The pedestrian 8f is sorted into another group G4 different from the three pedestrians 8c present on the crosswalk 1c. As described above, a plurality of objects are sorted into groups depending on a degree of observance of traffic rules based on the positions of the objects.

The determination in step S590 is based on the distance, but may be based on the moving direction of the respective pedestrians instead of the distance or in addition to the distance. For example, when the moving direction of a pedestrian conforms to the extending direction of the crosswalk, the pedestrian can be determined to be crossing the road. When the moving direction does not conform to the extending direction of the crosswalk, the pedestrian is determined not to follow the traffic rules and thus determined to have a large influence on the movement of the host vehicle. In step S590, such a pedestrian may be sorted into the other group G4 different from the three pedestrians 8c when the pedestrian does not satisfy both of or either of the conditions of the distance and the moving direction.

As shown in FIG. 5A, since the crosswalk region 1A is not present on the traveling route 9, the pedestrians 8a and 8b grouped in step S510 can be determined not to be present on the traveling route 9. In this case (NO in step S540), the degree of influence of the six pedestrians 8a and 8b located in the crosswalk region 1A may be determined to be small. The process then proceeds to step S580, and the distance between the respective pedestrians is compared with a predetermined threshold D2. In step S570, the pedestrians with the distance smaller than the threshold D2 are sorted into the same group. The threshold D2 is greater than the threshold D1. The threshold D2 is set to have the same length as the crosswalk, namely, the same width as the road, for example. The two pedestrians 8a and 8b separated from each other in the crosswalk region 1A are thus sorted into the same group G3.

As described above, the first processing can execute the grouping of the pedestrians located within the intersection 1 in accordance with the distances between the pedestrians, the moving directions, and the relationship between the traveling route 9 of the host vehicle and the respective positions of the pedestrians.

(Second Processing)

Figure 6:
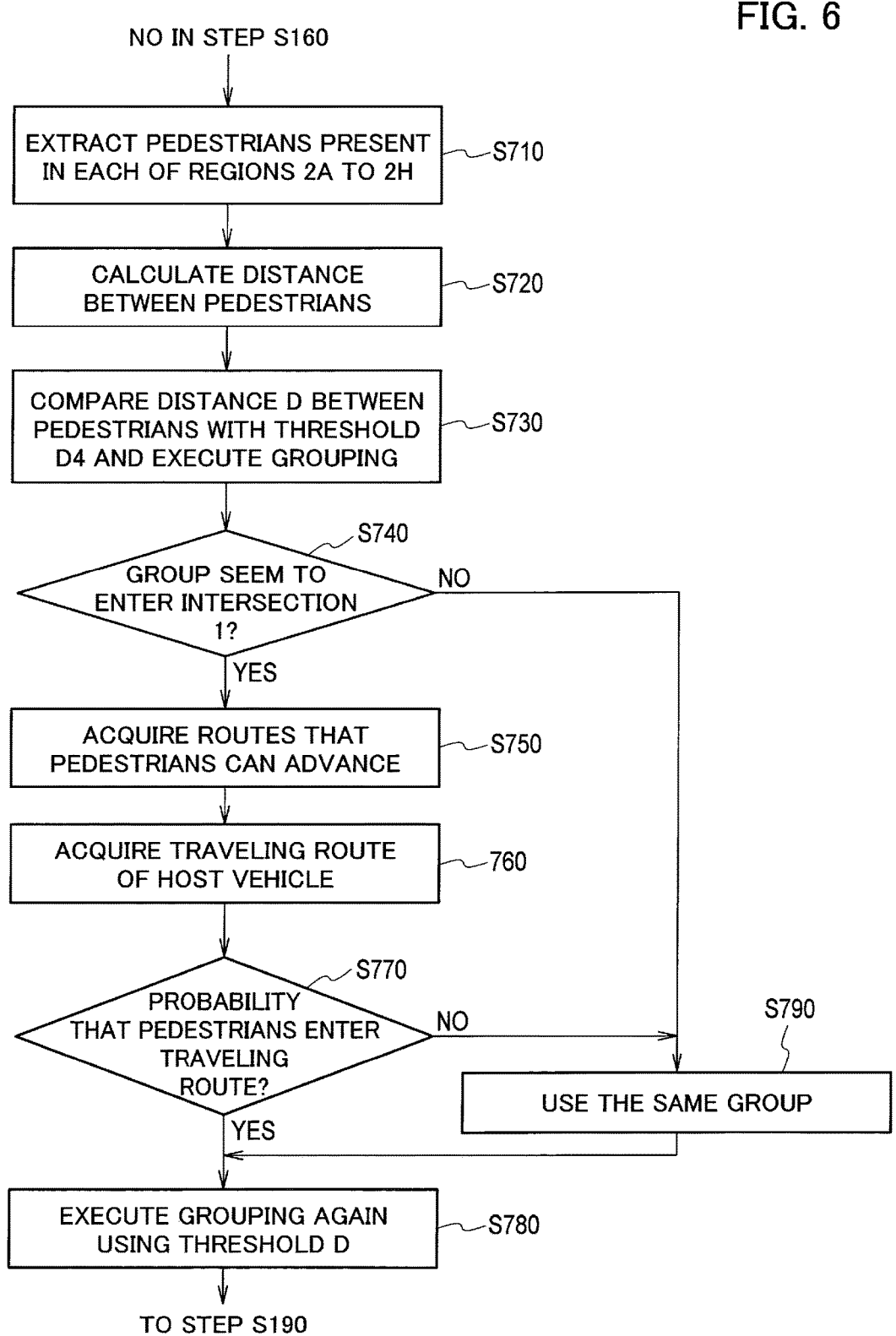
FIG. 6 is a flowchart showing specific steps of the second processing (step S180) in FIG. 2.
Figure 7A:
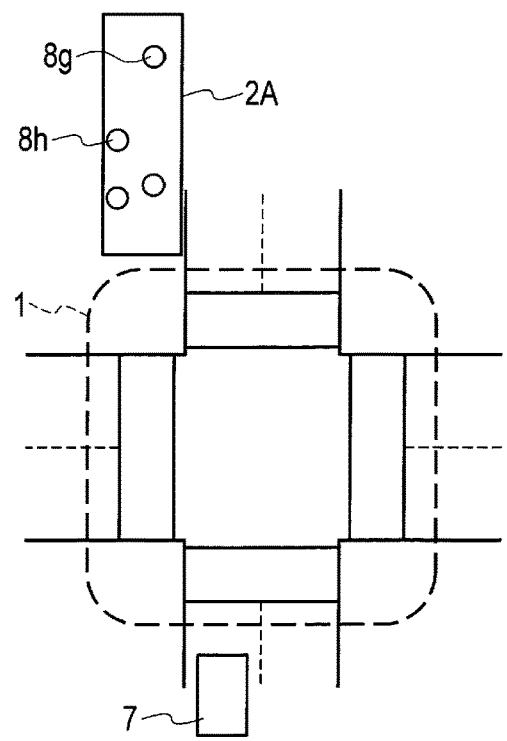
FIG. 7A is a view for describing the second processing, showing pedestrians 8g and 8h present on a sidewalk region 2A.

The specific steps of the second processing (step S180 in FIG. 2) are described below with reference to FIG. 6. In step S710, pedestrians located in each of the sidewalk regions 2A to 2H shown in FIG. 2 are extracted. For example, as shown in FIG. 7A, four pedestrians 8g and 8h located in the sidewalk region 2A are extracted.

Figure 7B:
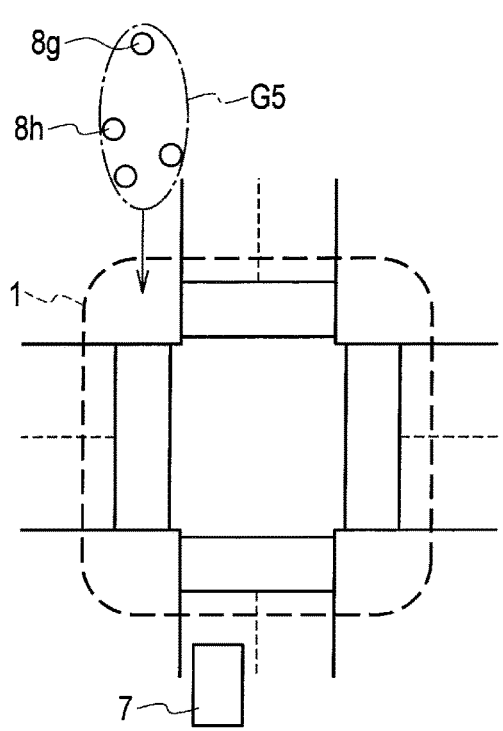
FIG. 7B is a view for describing the second processing, showing a moving direction of the pedestrians 8g and 8h present on the sidewalk region 2A.

The process proceeds to step S720, and a distance between the respective pedestrians located in the same sidewalk region is calculated in accordance with the relative position of the respective pedestrians to the host vehicle 7. The process proceeds to step S730, and the distance between the respective pedestrians is compared with a predetermined threshold D4. The pedestrians with the distance smaller than the threshold D4 are sorted into the same group. For example, as shown in FIG. 7B, the distances between the four pedestrians 8g and 8h are smaller than the threshold D4, and pedestrians 8g and 8h are thus sorted into the same group G5. The threshold D4 is twice as large as the threshold D2, for example. When the distance between the pedestrians is the threshold D4 or greater, the corresponding pedestrians are sorted into another group.

The process proceeds to step S740, and the determination of whether each sorted group seems to enter the intersection 1 is made. For example, each group is determined whether to enter the intersection 1 within a predetermined time according to a moving velocity and a moving direction of each group and a distance between each group and the intersection 1.

Figure 7C:
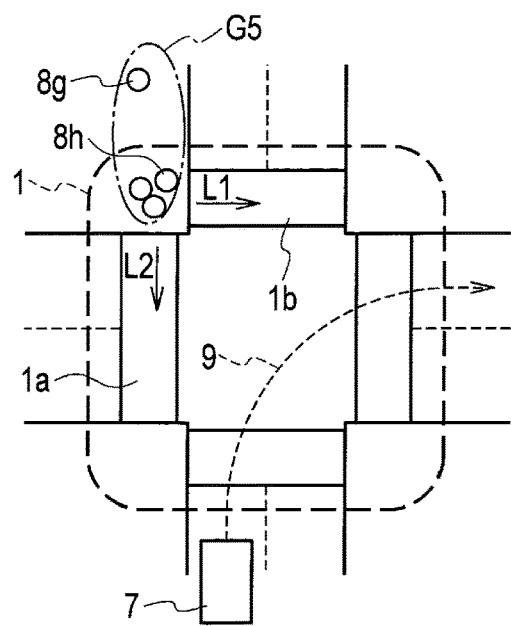
FIG. 7C is a view for describing the second processing, showing routes L1 and L2 which the pedestrians 8g and 8h can advance.

When each group seems to enter the intersection 1 (YES in step S740), the process proceeds to step S750, and possible routes that the pedestrians 8g and 8h belonging to the same group and following the traffic rules can advance are acquired. For example, the pedestrians 8g and 8h belonging to the group G5 shown in FIG. 7C are determined to be going to enter the intersection 1, so that routes L1 and L2 across the crosswalks 1a and 1b within the intersection are acquired.

The process proceeds to step S760, and the traveling route 9 acquired by the host vehicle information acquisition circuit 40 is loaded. For example, the traveling route 9 for turning right at the intersection is loaded. The process proceeds to step S770, and the determination of whether the pedestrians 8g and 8h can enter the traveling route 9 is made according to the routes L1 and L2 and the traveling route 9. For example, as shown in FIG. 7C, when the traveling route 9 does not intersect either of the routes L1 and L2, the probability that the pedestrians 8g and 8h enter the traveling route 9 is determined to be little.

When there is little probability that the pedestrians 8g and 8h enter the traveling route 9 (NO in step S770), the influence of the pedestrians on the movement of the host vehicle 7 can be determined to be small. The process then proceeds to step S790 without further specific grouping, and the groups obtained in the processing in step S730 are continuously used. For example, the group G5 including the four pedestrians 8g and 8h remains the same.

When there is a probability that the pedestrians 8g and 8h enter the traveling route 9 (YES in step S770), the influence of the pedestrians on the movement of the host vehicle 7 can be determined to be high. The process then proceeds to step S780 in order to sort the pedestrians into further specific groups than in step S730, and the grouping processing is executed again in accordance with the threshold D1 smaller than the threshold D4.

Figure 7D:
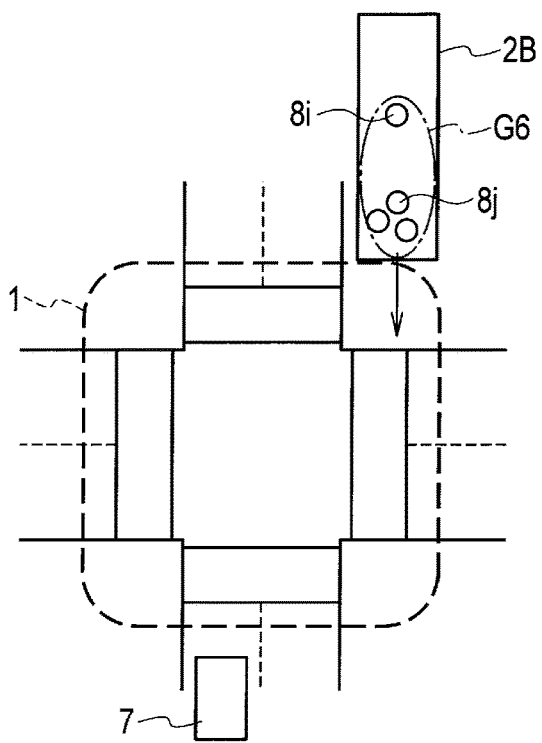
FIG. 7D is a view for describing the second processing, showing a moving direction of pedestrians 8i and 8j present on a sidewalk region 2B.
Figure 7E:
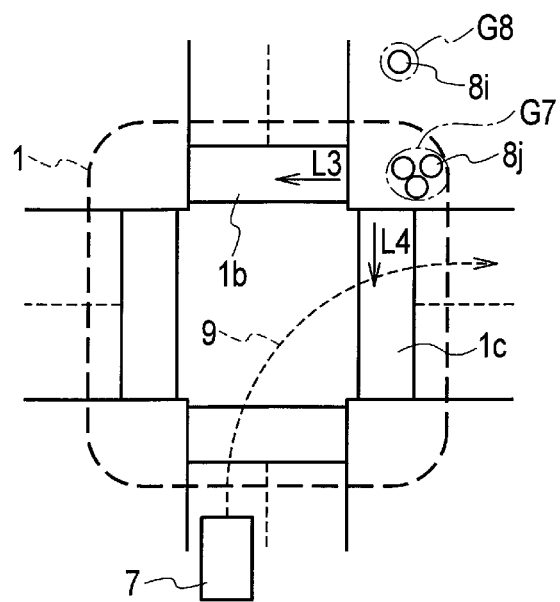
FIG. 7E is a view for describing the second processing, showing routes L3 and L4 which the pedestrians 8i and 8j can advance.

For example, as shown in FIG. 7D, four pedestrians 8i and 8j located in the sidewalk 2B are sorted into the same group G6 in step S730. When the group G6 seems to enter the intersection 1 (YES in step S740), possible routes L3 and L4 that the pedestrians 8i and 8j belonging to the group G6 can advance are acquired, as shown in FIG. 7E. Since either of the routes L3 and L4 intersects the traveling route 9 (YES in step S770), the process proceeds to step S780. When the distance between the pedestrian 8i and the pedestrians 8j is determined to be greater than the threshold D1, the pedestrian 8i and the pedestrians 8j are sorted into the different groups G7 and G8, as shown in FIG. 7E. Namely, the four pedestrians 8i and 8j located in the sidewalk region 2B are subjected to another grouping in a narrower region than in step S730.

While the influence of the pedestrians on the movement of the host vehicle 7 are determined in accordance with the relationship between the traveling route 9 and the routes L3 and L4, the determination does not need to depend on this relationship. For example, the determination may be made in accordance with a relationship between a current position of the host vehicle 7 and the routes L3 and L4. In particular, a wider region may be used to sort pedestrians into a single group as a distance between the current position of the host vehicle 7 and the routes L3 and L4 that the pedestrians 8i and 8j can advance is greater.

In step S740, when the group does not seem to enter the intersection 1 (NO in step S740), the influence of the pedestrians belonging to the group on the movement of the host vehicle 7 can be determined to be small. The process then proceeds to step S790, and the group obtained in the processing in step S730 is continuously used.

As described above, the second processing can execute the grouping of the pedestrians located outside the intersection 1 and inside the region around the intersection 2 shown in FIG. 3 in accordance with the distances between the pedestrians, the moving directions, and the relationship between the traveling route 9 of the host vehicle and the respective positions of the pedestrians.

(Third Processing)

Figure 10:
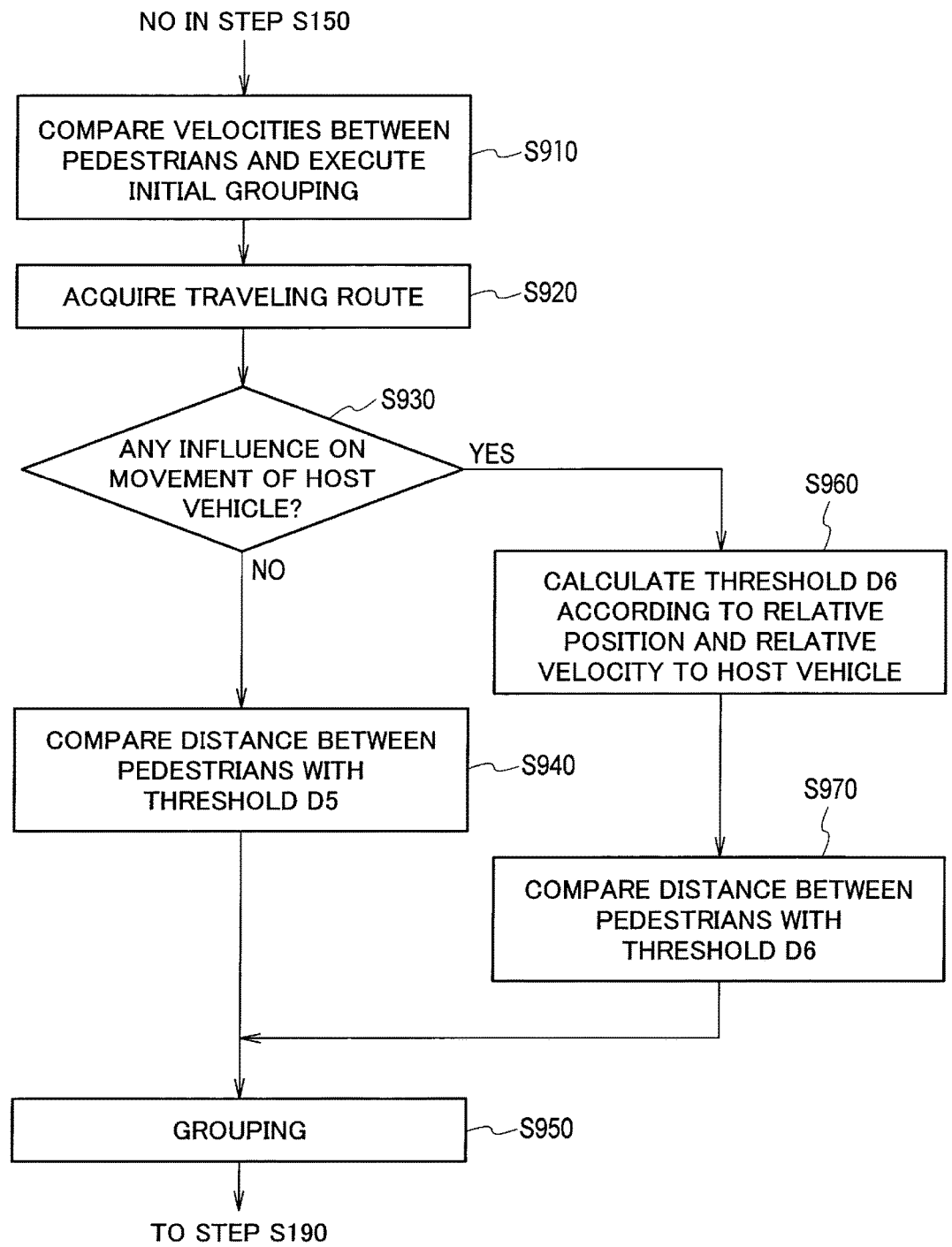
FIG. 10 is a flowchart showing specific steps of the third processing (step S220) in FIG. 2.

The specific steps of the third processing (step S220 in FIG. 2) are described below with reference to FIG. 10. The third processing executes the grouping of pedestrians located outside the region around the intersection 2.

In step S910, a plurality of pedestrians simultaneously extracted are subjected to grouping in accordance with moving velocities. In particular, the group determination circuit 60 calculates a velocity difference ($\Delta V$) between the respective pedestrians moving in the same direction extracted in step S130 in FIG. 2. The pedestrians of which the velocity difference ($\Delta V$) is a predetermined value or smaller are sorted into the same group.

Figure 11A:
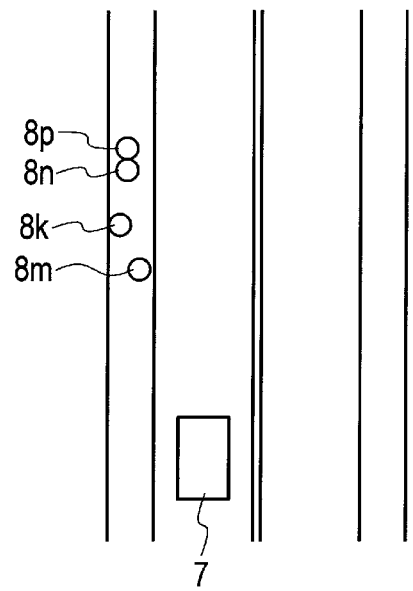
FIG. 11A is a plan view showing four pedestrians 8k, 8m, 8n, and 8p moving on a sidewalk in the same direction.
Figure 11B:
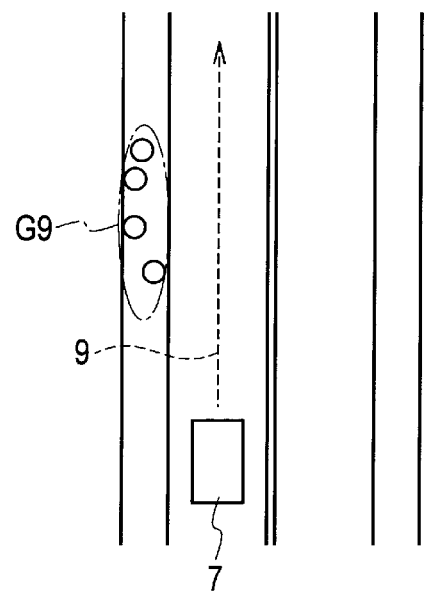
FIG. 11B is a plan view showing an example of sorting out the four pedestrians 8k, 8m, 8n, and 8p into group G9.

For example, as shown in FIG. 11A, the object tracking device extracts four pedestrians 8k, 8m, 8n, and 8p moving in the same direction. When the velocity differences ($\Delta V$) between the pedestrians are all the predetermined value or smaller, the pedestrians 8k, 8m, 8n, and 8p are sorted into the same group G9, as shown in FIG. 11B.

Figure 11C:
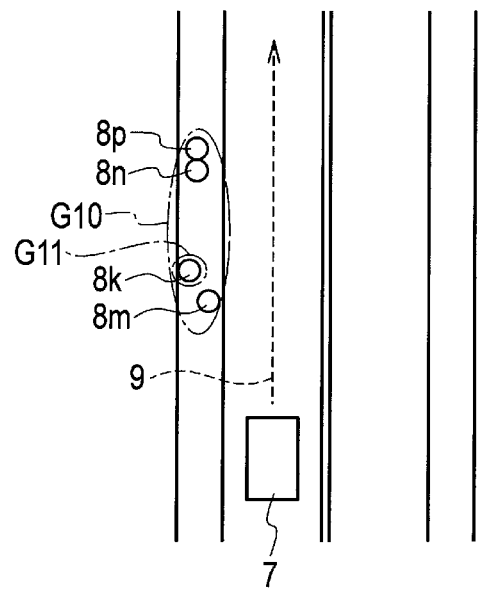
FIG. 11C is a plan view showing an example of sorting out the four pedestrians 8k, 8m, 8n, and 8p into two groups G10 and G11 according to moving velocities.
Figure 11D:
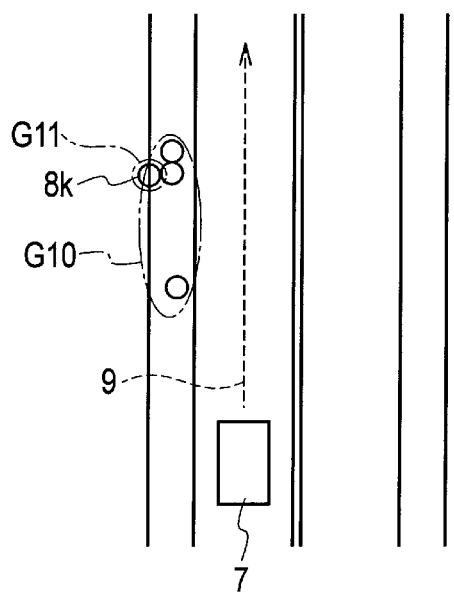
FIG. 11D is a plan view showing a state in which the pedestrian 8k is overtaking the other pedestrians 8m, 8n, and 8p.
Figure 11E:
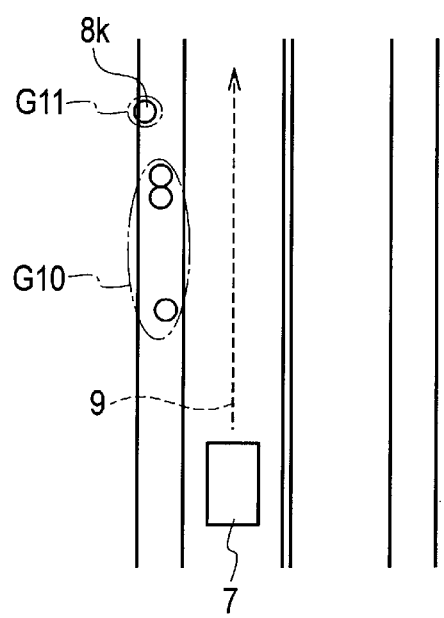
FIG. 11E is a plan view showing a state in which the pedestrian 8k has overtaken the other pedestrians 8m, 8n, and 8p.

The moving velocity of the pedestrian 8k of the pedestrians 8k, 8m, 8n, and 8p is faster by a predetermined value or greater than the other pedestrians 8m, 8n, and 8p. The velocity differences ($\Delta V$) between the other pedestrians 8m, 8n, and 8p are all the predetermined value or smaller. In this case, the pedestrian 8k and the other pedestrians 8m, 8n, and 8p are sorted into the different groups G11 and G10. This grouping can decrease the variance in the number or the size of each group when the faster pedestrian 8k is coming closer to the slower pedestrians 8m, 8n, and 8p (FIG. 11C and FIG. 11D) or separating from the slower pedestrians 8m, 8n, and 8p (FIG. 11E), for example. The predetermined value of the velocity differences (ΔV) is defined according to the determination of whether the faster pedestrian 8k can overtake the slower pedestrians 8m, 8n, and 8p within a period in which the host vehicle 7 can detect.

Figure 12A:
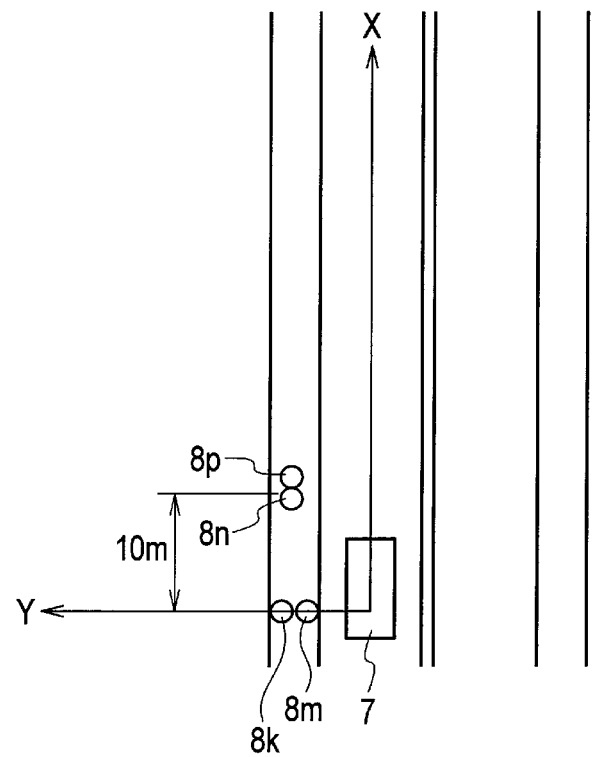
FIG. 12A is a plan view showing a relationship between a movement of a host vehicle 7 and movements of the pedestrians 8k, 8m, 8n, and 8p.
Figure 12B:
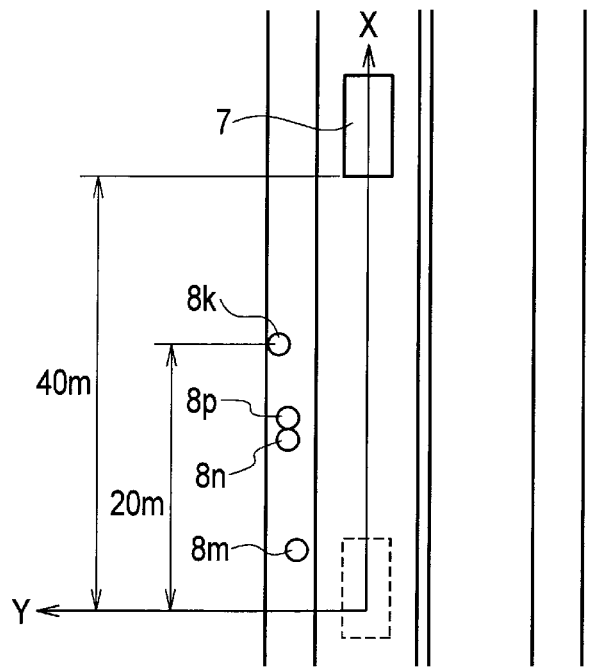
FIG. 12B is a plan view showing a relationship between the movement of the host vehicle 7 and the movements of the pedestrians 8k, 8m, 8n, and 8p.

For example, as shown in FIG. 12A, the object detection sensor 10 installed in the host vehicle 7 detects four pedestrians 8k, 8m, 8n, and 8p. The moving velocity of the pedestrians 8m, 8n, and 8p is low (for example, four kilometers per hour), while the moving velocity of the pedestrian 8k is high (for example, 15 kilometers per hour). The object detection sensor 10 can detect objects within a range 40 meters away from the rear end of the host vehicle 7. When the host vehicle 7 is traveling at a velocity of 30 kilometers per hour, it takes 4.8 seconds for the host vehicle 7 to move 40 meters from the position shown in FIG. 12A. During this movement, the pedestrians 8k, 8m, 8n, and 8p move 5.3 meters, and the pedestrian 8k moves 20 meters, resulting in the positional relationship as shown in FIG. 12B. The pedestrian 8k comes up with and overtakes to go away from the pedestrians 8n and 8p in front of the pedestrian 8k. Under such conditions, the pedestrian 8k is sorted into a group different from the pedestrians 8m, 8n, and 8p. The velocity difference (ΔV) between the pedestrian 8m and the pedestrians 8n and 8p is the predetermined value or smaller, and the positional relationship between the pedestrians 8m, 8n, and 8p has not been changed, as shown in FIG. 12A and FIG. 12B. Under such conditions, the pedestrian 8m and the two pedestrians 8n and 8p in front of the pedestrian 8m are sorted into the same group.

The process proceeds to step S920, and the traveling route 9 acquired by the host vehicle information acquisition circuit 40 is loaded. The process proceeds to step S930, and the determination of whether the positions of the pedestrians have an influence on the movement of the host vehicle 7 is made according to the traveling route 9. In particular, the determination of whether there is a probability that the positions of the pedestrians move to interfere with the traveling route 9, in the same manner as in the first and second processing.

Figure 13A:
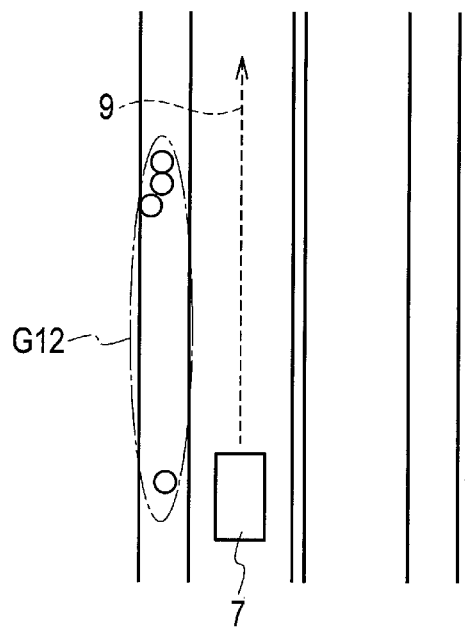
FIG. 13A is a plan view showing an example that the positions of the pedestrians 8k, 8m, 8n, and 8p have no influence on the movement of the host vehicle 7.
Figure 13B:
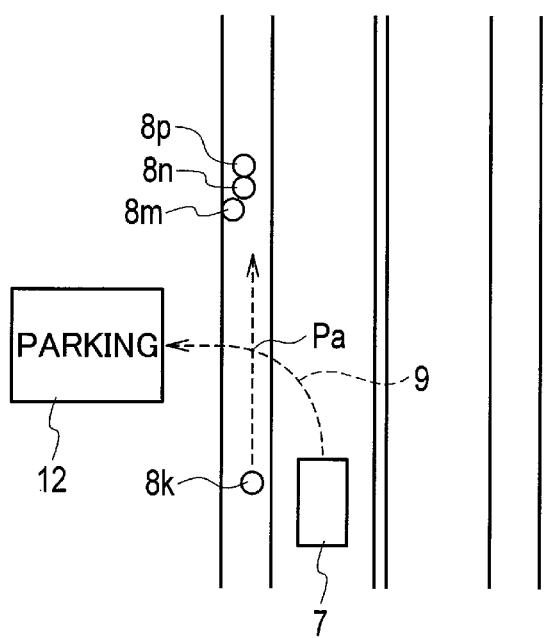
FIG. 13B is a plan view showing an example that the positions of the pedestrians 8k, 8m, 8n, and 8p have an influence on the movement of the host vehicle 7.

For example, as shown in FIG. 13A, when the traveling route 9 indicates a straight movement on the road, there is no probability that the positions of the pedestrians 8k, 8m, 8n, and 8p move to interfere with the traveling route 9. The determination is thus made that the positions of the pedestrians 8k, 8m, 8n, and 8p have no influence on the movement of the host vehicle 7 (NO in step S930), and the process proceeds to step 940. When the traveling route 9 indicates that the host vehicle 7 is entering a parking 12 located along the road, as shown in FIG. 13B, there is a probability that the positions of the pedestrians 8k, 8m, 8n, and 8p interfere with the traveling route 9. The determination is thus made that the positions of the pedestrians 8k, 8m, 8n, and 8p have an influence on the movement of the host vehicle 7 (YES in step S930), and the process proceeds to step S960.

In step S940, the distance between the respective pedestrians is compared with a threshold D5. In step S950, the pedestrians with the distance smaller than the threshold D5 are sorted into the same group. For example, the threshold D5 is set to infinity, and the four pedestrians 8k, 8m, 8n, and 8p moving on the same sidewalk in the same direction are all sorted into the same group G12, as shown in FIG. 13A.

In step S960, a threshold D6 is set in view of the distance and the relative velocity between the respective pedestrians, and the velocity of the host vehicle 7. The process proceeds to step S970, and the distance between the respective pedestrians is compared with the threshold D6. For example, as shown in FIG. 13B, a difference in arrival time to a collision point Pa between the pedestrian 8k and the host vehicle 7 is calculated, and the host vehicle 7 is determined to be able to pass through a space between the pedestrian 8k and the pedestrian 8m when the time difference is a predetermined time (for example, two or three seconds) or greater. More particularly, when a distance between the pedestrian 8k and the pedestrian 8m is a value or greater obtained by multiplying the moving velocity of the pedestrian 8k by a predetermined time (two or three seconds), as shown in FIG. 13D, the host vehicle 7 can pass through the space between the pedestrian 8k and the pedestrian 8m. In this case, in step S950, the pedestrian 8k and the other three pedestrians 8m, 8n, and 8p are sorted into the different groups G14 and G15.

Figure 13C:
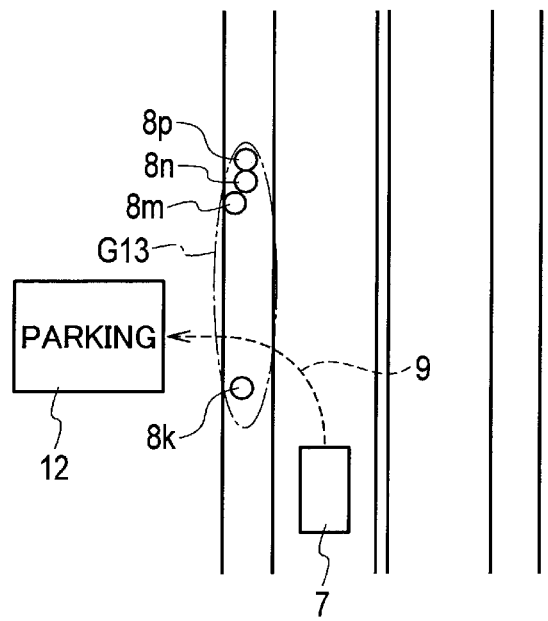
FIG. 13C is a plan view showing an example that the host vehicle 7 cannot pass through a space between the pedestrian 8k and the pedestrian 8m.
Figure 13D:
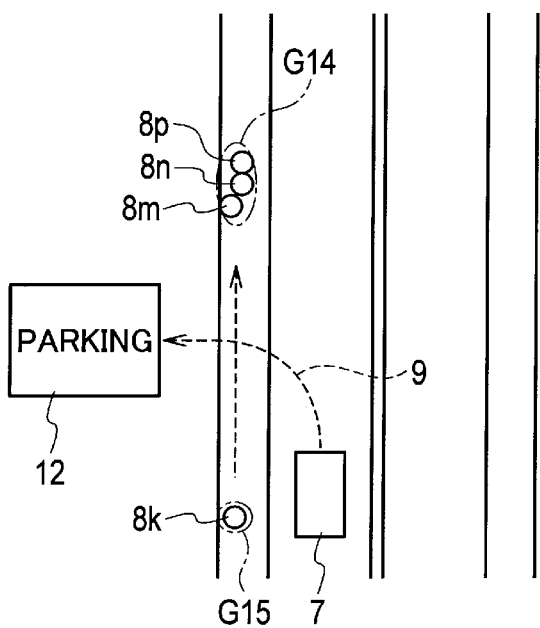
FIG. 13D is a plan view showing an example that the host vehicle 7 can pass through the space between the pedestrian 8k and the pedestrian 8m.

When the distance between the pedestrian 8k and the pedestrian 8m is less than the value obtained by multiplying the moving velocity of the pedestrian 8k by a predetermined time (two or three seconds), as shown in FIG. 13C, the host vehicle 7 cannot pass through the space between the pedestrian 8k and the pedestrian 8m. In this case, in step S950, the pedestrian 8k and the other three pedestrians 8m, 8n, and 8p are sorted into the same group G13.

This embodiment has been illustrated with pedestrians as an example of objects, but is not limited to this illustration. For example, the pedestrian extract circuit 20 may extract not only pedestrians but also bicycles as targets to be tracked. The pedestrians to be tracked of course include those who are walking at a velocity of about four kilometers per hour but also those who are moving faster, namely those who are running.

As described above, this embodiment can achieve the following effects.

When a plurality of objects are detected, the objects are sorted into groups in accordance with the degree of influence of the positions of the objects located on, for example, crosswalks or bicycle lanes, on the movement of the host vehicle, the degree of influence including intersecting conditions of the objects with respect to the moving direction of the host vehicle and the time obtained by dividing the relative distance of each object to the host vehicle by the approaching velocity. Each of the sorted groups is tracked as an object in a time series. Accordingly, two or more objects sorted into the same group can be tracked as a single object in a time series. Since the number of objects tracked in a time series can be decreased, the calculating load can be reduced when tracking a plurality of objects in a time series.

As the degree of influence of the positions of the objects on the movement of the host vehicle is smaller, the objects located in a wider region are sorted into the same group. Since the number of groups can be decreased while ensuring the safety of movement of the host vehicle, the calculating load can be reduced.

As the positions of the objects are farther from the traveling route 9 of the host vehicle, the degree of influence of the objects on the movement of the host vehicle is determined to be smaller. The grouping thus can be executed in a wide region with respect to the objects having short relative distances, but located outside the traveling route. Accordingly, the number of objects to be tracked is decreased, reducing the calculating load of the system. As the positions of the objects are closer to the traveling route 9 of the host vehicle, the degree of influence of the objects on the movement of the host vehicle is determined to be greater. The grouping is executed in a narrow region with respect to the objects having long relative distances but coming closer to the traveling route. Accordingly, the higher safety of movement of the host vehicle can be ensured.

The degree of influence on the movement of the host vehicle may be determined to be smaller as the positions of the objects are farther from the host vehicle. Since the grouping can be executed in a wide region with respect to the objects distant from the host vehicle, the detection error of the sensor with respect to the objects distant from the host vehicle can be allowed, so as to decrease the number of groups to be sorted.

As described in the third processing (FIG. 10, and FIG. 11A to FIG. 11E), a plurality of objects are sorted into groups in accordance with the moving amounts of the objects (including the moving velocities and the moving directions). Accordingly, the variance in the number of groups and the size and central position of each group is decreased, so as to obtain more stable detection results.

Figure 4:
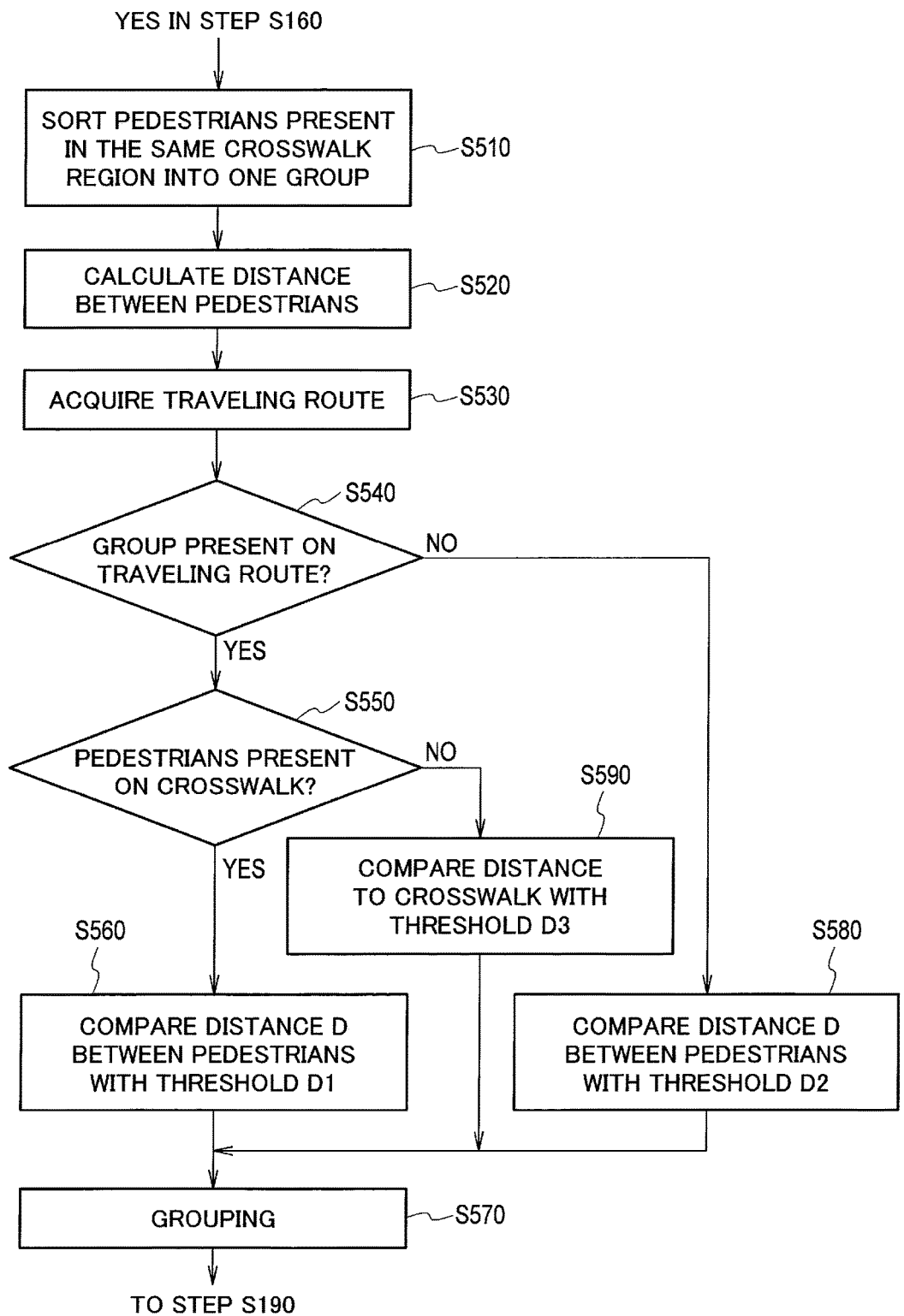
FIG. 4 is a flowchart showing specific steps of the first processing (step S170) in FIG. 2.

As illustrated in FIG. 5D and in step S590 in FIG. 4, a plurality of objects are sorted into groups in accordance with the degree of observance of traffic rules. Since objects not following the traffic rules can be tracked as a group different from objects following the traffic rules, the host vehicle can make an action more safely.

While the present invention has been described above by reference to the embodiment, it should be understood that the present invention is not intended to be limited to the descriptions of the Specification and the drawings composing part of this disclosure. Various alternative embodiments, examples, and technical applications will be apparent to those skilled in the art according to this disclosure.

This embodiment has been illustrated with the case in which the influence of positions of objects on the movement of the host vehicle are evaluated depending on the intersecting conditions of the traveling route of the host vehicle with respect to the positions of the objects on the map or the intersecting conditions of the traveling route of the host vehicle with respect to the moving directions of the objects, but is not limited to this illustration. For example, the influence may be evaluated depending on the relative distance between the host vehicle and the respective objects or the approaching velocity of the respective objects approaching the host vehicle. In particular, as the relative distance between the host vehicle and the respective objects is shorter, or as the approaching velocity of the respective objects approaching the host vehicle is greater, the influence of the positions of the objects on the movement of the host vehicle may be determined to be greater. In addition, as the time to collision (TTC) obtained by dividing the relative distance by the approaching time is shorter, the influence of the position of the respective objects on the movement of the host vehicle may be determined to be greater.

The relative distance between the host vehicle and an object may be either a distance between the current position of the host vehicle and the current position of the object or a distance between the traveling route of the host vehicle and the current position of the object. The relative distance between the host vehicle and the object may be a distance between estimated positions of the host vehicle and the object after a predetermined time estimated in accordance with the positions of the host vehicle and the object on the map, the moving directions, and the moving velocities. The estimated position of the host vehicle after a predetermined time can be calculated from the traveling route.

The approaching velocity of an object approaching the host vehicle may be either a current approaching velocity or an approaching velocity after a predetermined time. The approaching velocity after a predetermined time may be estimated in accordance with the traveling route of the host vehicle, the position of the object on the map, and the moving direction and the moving velocity of the object. The moving direction and the moving velocity of the host vehicle after a predetermined time can be calculated from the traveling route of the host vehicle. The traveling direction and the traveling velocity of the object after a predetermined time can be estimated in accordance with the current position of the object on the map, and the current moving direction and the current moving velocity of the object.

As the threshold of the distance between the respective objects upon grouping determination is larger, the objects distributed in a wider range can be sorted into the same group, so as to expand the region subjected to grouping. When the influence of the positions of the objects is evaluated to be small, the threshold of the distance between the objects is increased, so as to widen the region subjected to grouping.

The influence of objects present around the host vehicle on the traveling of the host vehicle differs depending on objects. For example, when an autonomous driving control is performed on the host vehicle, a destination and a traveling route to the destination are preliminarily set. The influence of an object on the traveling of the host vehicle in this case varies depending on the position and the traveling route of the host vehicle on the map and the position of the object on the map. The technical meaning of tracking all of the objects around the host vehicle individually is little, and it is sufficient to track a plurality of objects collectively when the influence of the objects on the traveling of the host vehicle is small. The present embodiment can prevent an increase in the calculating load of the autonomous driving system while ensuring the safe traveling of the host vehicle particularly when a large number of pedestrians are detected around the intersection 2. The prevention of the increase in the calculating load can prevent a decrease in processing speed of the autonomous driving system accordingly.

The functions described in the embodiment may be implemented in one or more processing circuits. A processing circuit includes a programmed processing device such as a processing device including an electric circuit. Such a processing device includes an application specific integrated circuit (ASIC) configured to execute the functions described in the embodiment or conventional circuit components.

REFERENCE SIGNS LIST 1a to 1d crosswalk
1A to 1D crosswalk region
2A to 2H sidewalk region
8a to 8p pedestrian
9 traveling route
10 object detection sensor
20 pedestrian extraction circuit
30 map information acquisition circuit
40 host vehicle information acquisition circuit
60 group determination circuit
70 tracking circuit
80 calculation circuit
L1 to L4 route
D1 to D6 threshold

The invention claimed is:

1. An object tracking method of tracking objects in a time series using a sensor for detecting the objects around a host vehicle, the method comprising:
when a plurality of objects are detected, sorting the objects into groups in accordance with a degree of influence of positional relationship between the host vehicle and the objects on a movement of the host vehicle; and tracking each of the groups as a single object in a time series.

2. The object tracking method according to claim 1, wherein, as the degree of influence of the positional relationship between the host vehicle and the objects on the movement of the host vehicle is smaller, the objects located in a wider region are sorted into a single group.

3. The object tracking method according to claim 2, wherein, as the positions of the objects are farther from a traveling route of the host vehicle, the degree of influence on the movement of the host vehicle is determined to be smaller.

4. The object tracking method according to claim 2, wherein, as the positions of the objects are farther from the host vehicle, the degree of influence on the movement of the host vehicle is determined to be smaller.

5. The object tracking method according to claim 1, wherein, when the plurality of objects are detected, the objects are sorted into groups in accordance with the degree of influence of the positional relationship between the host vehicle and the objects on the movement of the host vehicle and a moving amount of the respective objects.

6. The object tracking method according to claim 1, wherein, when the plurality of objects are detected, the objects are sorted into groups in accordance with the degree of influence of the positional relationship between the host vehicle and the objects on the movement of the host vehicle and a degree of observance of a traffic rule that the positions of the objects follow.

7. An object tracking device comprising:

a sensor for detecting objects around a host vehicle; and a calculation circuit for tracking the objects in a time series, the calculation circuit being configured to, when a plurality of objects are detected, sort the objects into groups in accordance with a degree of influence of positional relationship between the host vehicle and the objects on a movement of the host vehicle, and track each of the groups as a single object in a time series.

* * * * *